UNITED STATES PATENT OFFICE.

SETH W. EDDY, OF LINCOLN, NEBRASKA.

MIRROR.

1,001,581. Specification of Letters Patent. Patented Aug. 22, 1911.

No Drawing. Application filed September 15, 1908. Serial No. 453,213.

*To all whom it may concern:*

Be it known that I, SETH W. EDDY, a citizen of the United States, residing in Lincoln, in the county of Lancaster and State of Nebraska, have invented a new and useful Improvement in Mirrors, of which the following is a specification.

The present invention relates to mirrors of the character employed for reflecting the human countenance, and has for its purpose to provide such a mirror which will more definitely sustain the principal color component of flesh tints than do mirrors of ordinary construction, and not appreciably absorb the other color components of the human countenance.

The glass heretofore and at present used in the manufacture of mirrors has invariably a color or tint of yellow, green, blue, or modifications thereof, as may be ascertained by viewing such glass edgewise. In the present state of the art it is not possible to manufacture a mirror of glass and backing free from color, for it is a well-known scientific fact that so-called white or clear glass, however pellucid it may be, is in reality green, although this tint may not be visible to the naked eye; and the best known substance for a reflecting material now commonly used is silver, and it is well known that silver reflects a blue light. A yellow, blue, or green medium neutralizes or absorbs to a greater or less extent any shade of red. And since the predominant shade of flesh tints is a shade of red, it follows that flesh tints reflected in mirrors heretofore and now manufactured, will to some extent be neutralized. It is therefore proposed to incorporate in the glass of a mirror, having a backing, a coloring element adapted to balance the other color components in the glass whereby the selective absorption in the glass will correct or compensate for the selective reflection of the mirror backing or other mirror component. To this end it is contemplated to embody in the mirror glass, during its manufacture, a coloring substance producing a shade of red commonly known as pigeon's blood ruby, which is observable only when the glass is viewed edgewise, and which, with some of the color components otherwise incident to the glass employed, will tend to produce an image in which the principal components of flesh color tints predominate or are sustained.

I am aware that colored glass, made particularly of shades of red, is a common article of manufacture, and therefore do not claim any process of manufacture of such glass, but do however believe myself to be the first to adopt, in the manufacture of mirrors, the principle of selective absorption in glass to correct or compensate for the selective reflection in the mirror backing or other component of the mirror, for the purpose aforesaid.

I claim:—

1. The combination with a glass mirror having a backing for reflecting the human countenance, of a coloring element carried thereby and adapted to balance the other color components in the glass whereby the selective absorption of said coloring element will compensate for the selective reflection of the mirror.

2. The combination with a glass mirror having a backing for reflecting the human countenance, of a coloring element incorporated in the glass adapted to balance the other color components in the glass whereby the selective absorption in the glass will compensate for the selective reflection of the mirror backing.

3. The combination with a glass mirror having a backing for reflecting the human countenance, of a coloring element, with red predominant, carried by the glass, adapted to balance the other color components in the glass, whereby the selective absorption of said coloring element will compensate for the selective reflection of the mirror, and tend to produce an image in which the flesh color tints are sustained.

SETH W. EDDY.

Witnesses:
J. A. RANDALL,
LORAINE FOLLETT.